W. G. HILL.
SHARPENING DEVICE FOR LAWN MOWERS.
APPLICATION FILED FEB. 11, 1920.
1,396,430.
Patented Nov. 8, 1921.
3 SHEETS—SHEET 3.
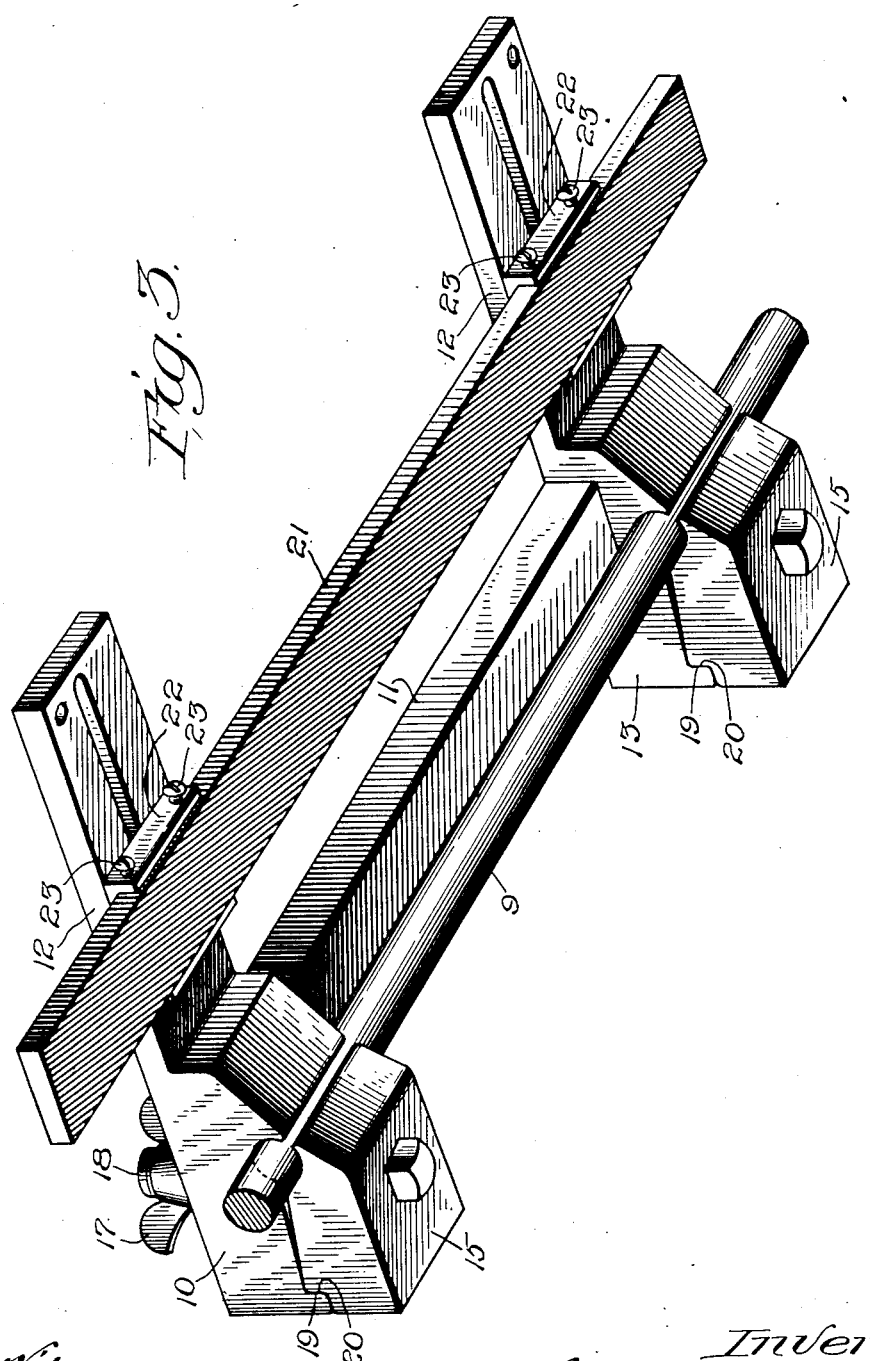

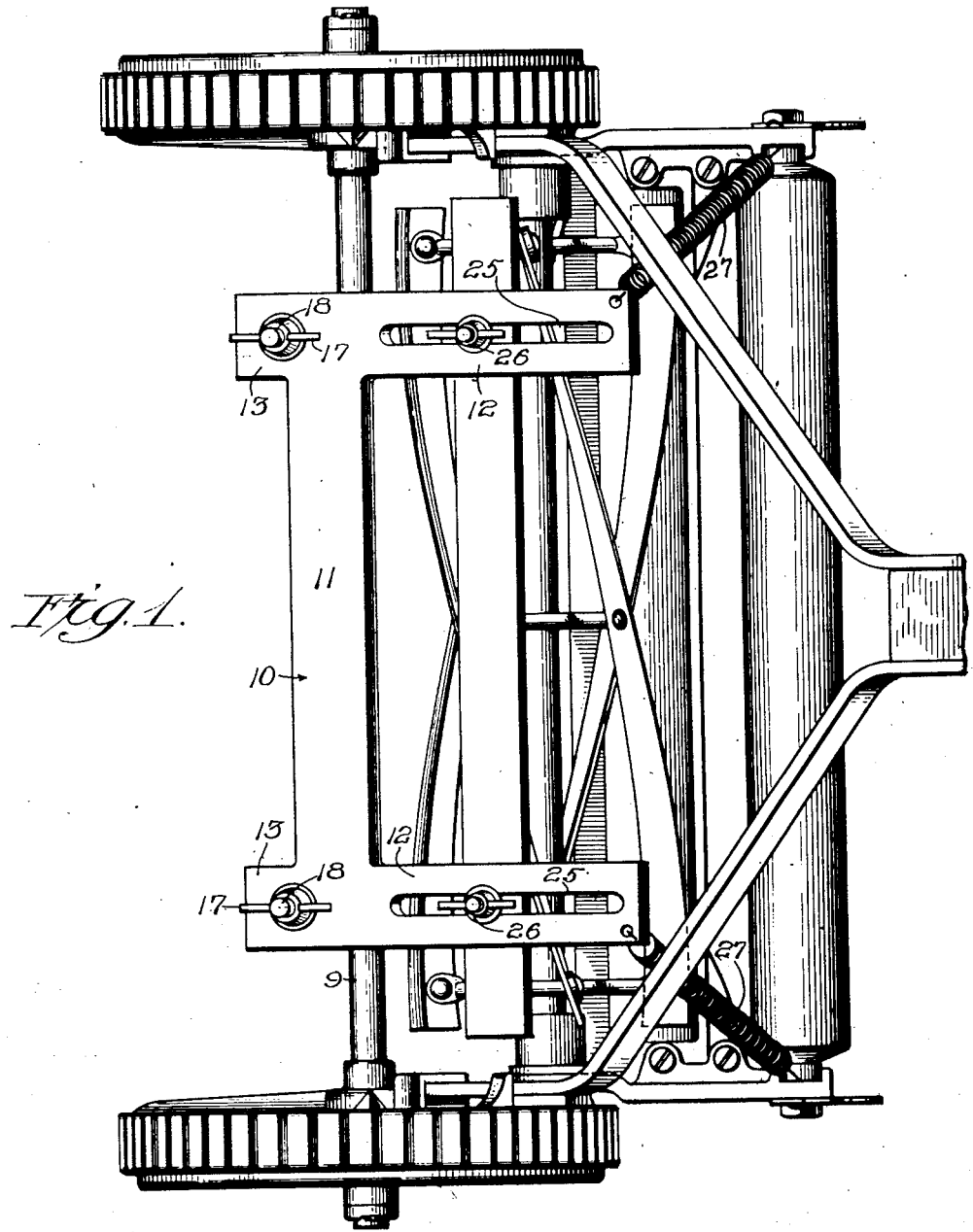

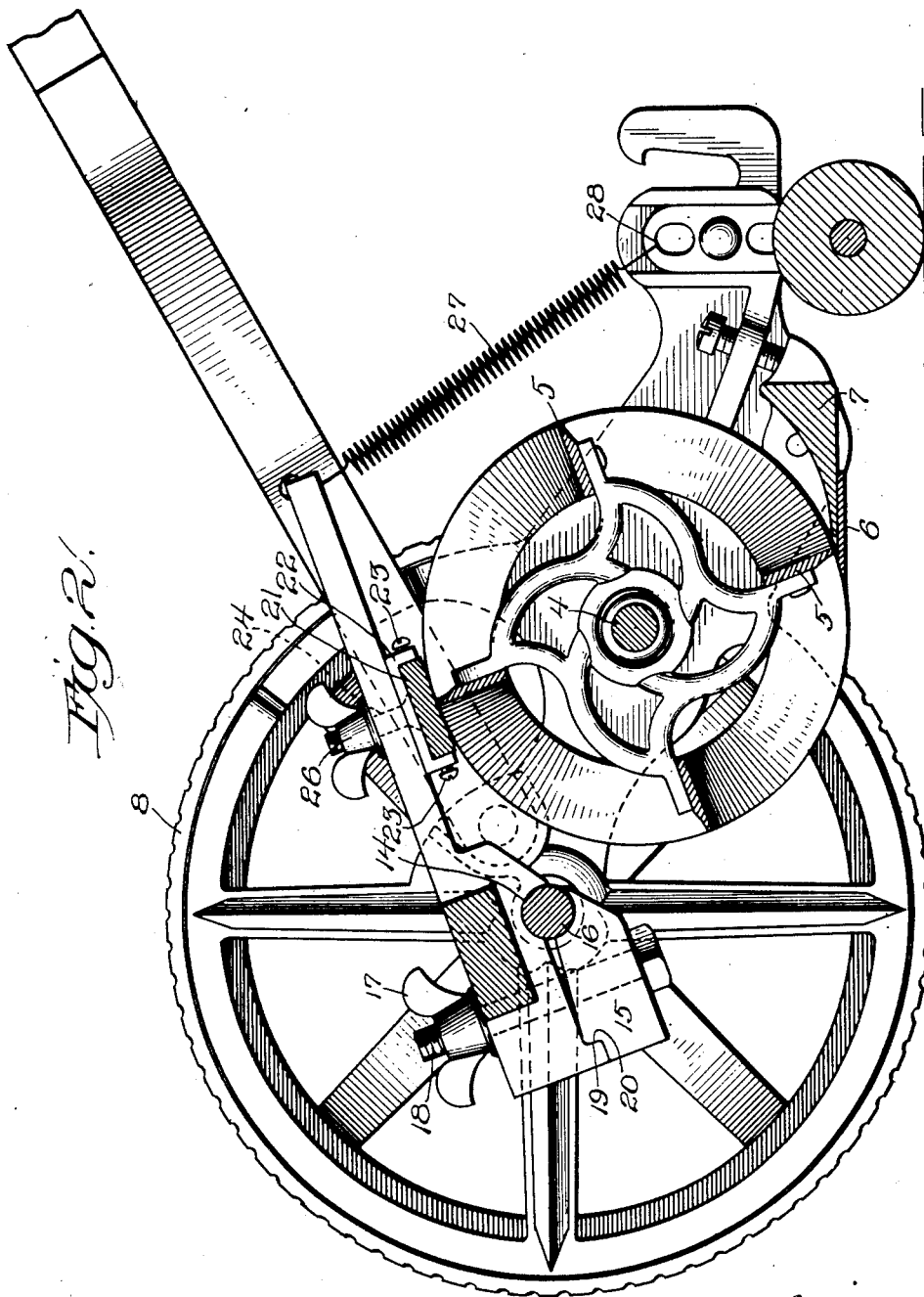

though carries the sharpening element

UNITED STATES PATENT OFFICE.

WALTER G. HILL, OF CHICAGO, ILLINOIS.

SHARPENING DEVICE FOR LAWN-MOWERS.

1,396,430.   Specification of Letters Patent.   Patented Nov. 8, 1921.

Application filed February 11, 1920. Serial No. 357,786.

*To all whom it may concern:*

Be it known that I, WALTER G. HILL, a citizen of the United States, residing at 4135 Kenneth avenue, Chicago, in the county of Cook and State of Illinois, have invented a new and useful Improvement in Sharpening Devices for Lawn-Mowers, of which the following is a specification.

My invention relates more particularly to devices for sharpening the rotatably mounted blades of lawn mowers; and my primary object, generally stated, is to provide a novel, simple and economical construction of device for this purpose, by which the revoluble blades of a lawn mower may be quickly and satisfactorily sharpened.

Referring to the accompanying drawings; Figure 1 is a plan view of a lawn mower, of a well known form shown as equipped with a sharpening device in accordance with my invention. Fig. 2 is a cross-sectional view of the structure of Fig. 1; and Fig. 3 a bottom perspective view of the device, with a portion of the rod of the mower on which it is supported, being shown by a perspective view.

I have shown my improved sharpening device in a form adapting it to be applied to operative position on lawn mowers as commonly provided, the mower shown in the drawings as equipped with my improved device, being of a common type and therefore need not be described in detail. It will be sufficient to state that the mower is formed of a rotatable cutting device comprising a shaft 4 journaled in the frame sides of the machine and equipped with the spirally disposed cutting blades 5, the cutting edges of which coöperate with a stationary shearing blade 6 shown as extending substantially horizontal from a bar 7 rigidly secured to the frame of the machine. The wheels of the mower, represented at 8 are shown as journaled upon the outer ends of a shaft 9 which latter is stationary and extends across the space between the wheels and in advance of the cutter blades 5, this shaft forming a part of the mower frame. It may be here stated that in some types of mowers this shaft, or rod, instead of being concentric with the wheels 8 extends in advance of the position of this shaft in the construction shown, but in any event the device as shown and as hereinafter described and which is its preferred embodiment, is adapted to be rigidly secured in sharpening position relative to the rotatable blade device 5.

It may be stated that the sharpener device is formed with a sharpening element 60 which may be made of any suitable material and provided of any suitable form, it being preferred that it be made of steel and provided in the form of a single-cut file as shown with the cutting edges of the file facing toward the rear of the machine, namely in the direction opposite that in which the cutting edges of the blades travel when contacting with the sharpening element, the sharpening element being secured in such position that upon rotating the revoluble blade device 5 upon the shaft 4, the cutting edges of these blades will rub against the sharpening surface and thereby sharpen these blades to substantially the same angle as they were originally sharpened to maintain the proper relationship between these blades and the stationary blade 6.

The sharpener device in the preferred embodiment shown, is formed of a U-shaped frame 10 providing the cross-piece 11 and the two rearwardly projecting arms 12. the cross-piece 11 preferably having the projections 13 at its opposite ends which extend in the direction opposite to the arms 12, the ends of the cross-piece 11 and the portions 13 being preferably of enlarged thickness as shown and provided with downwardly opening recesses 14 at which the frame is adapted to seat upon the rod 9 as shown in Fig. 2, there being provided for coöperation with the parts just referred to, blocks 15 which fit against the under side of the frame and are provided with upwardly-opening recesses 16 at which these blocks fit against the under side of the rod 9, the blocks 15 and the recessed portions of the frame, affording means whereby the rod 9 may be embraced by these parts, which in effect form clamps adapted to be tightened against the rod 9 through the medium of wing nuts 17 secured upon the upper, threaded, ends of bolts 18, which pass through the blocks 15 and the frame referred to. The under sides of the parts 13 are preferably shouldered as indicated at 19 to form abutments for the shouldered portions 20 of the blocks 15, thereby to provide an interlock between these parts as will be readily understood. By the construction just described, the frame which carries the sharpening element hereinbefore referred to, may be secured against displacement on the rod 9.

The sharpening element of the construction shown is represented at 21, this element, as hereinbefore stated being of any desirable form, but preferably in the form of a single-cut file which is shown as securely held to the arms 12 to extend lengthwise of the holder-frame and the revoluble blade portion, as by means of clips 22 having set screws 23 engaging the opposite edges of the sharpener element 21, these clips, which are located at the under sides of the arms 12, being provided with upwardly extending screws 24 which extend through elongated slots 25 in the arms 12 and are equipped with wing nuts 26 adapting these clips 22 and the sharpener element 21 held therein, to be rigidly secured to the arms 12 in any desired position of adjustment. The structure, by preference, is equipped with relatively light spring devices, shown as coil springs represented at 27, which connect with the outer ends of the arms 12 and with any suitable part of the frame of the machine, as for example as indicated at 28, whereby the holder frame is yieldingly swung on the rod 9 in clockwise direction in Fig. 2 to cause the sharpening element 21 to be drawn down against the blades to be sharpened, with the desired force. It will be understood, however, that if desired the springs may be eliminated in which case the clamps of which the bolts 18 are parts, would be tightened sufficiently to hold the sharpening surface 21 in a position wherein the desired rubbing engagement of the blades 5 with the sharpening surface 21, would be afforded.

The parts of the sharpening device would preferably be positioned as shown in the drawings, viz., to cause the surface of the sharpening element 21 against which the blades 5 rotate, to extend at a right angle to a line drawn through the axis of the shaft 4 and the blade 5 when the latter is in engagement with the sharpening surface of the element 21, as shown in Fig. 2.

While I have illustrated and described a particular construction embodying my invention, I do not wish to be understood as intending to limit it thereto as the same may be variously modified and altered without departing from the spirit of my invention.

What I claim as new and desire to secure by Letters Patent is:

1. A sharpening device for the purpose stated, comprising a supporting member adapted to be attached to the body of a lawn mower to extend adjacent the rotary blade portion thereof, and a sharpening element adjustably supported on said supporting member and adapted to be engaged by the cutting edges of the blade portion of the lawn mower.

2. A sharpening device for the purpose stated, comprising a supporting member adapted to be attached to a lawn mower to extend adjacent the rotary blade portion thereof, and having a portion which extends across said blade portion, and a sharpening element adjustably supported along said portion of said supporting member, and in the plane in which said sharpening element extends, and adapted to be engaged by the cutting edges of the blade portion of the lawn mower.

3. A sharpening device for the purpose stated, comprising a supporting member having means for attaching it to a cross member of a lawn mower of the rotary blade device type, said supporting member being provided with a slotted portion which extends over the blade device, and a sharpening element connected with said supporting member at the said slotted portion and adapting the sharpening element to be adjusted on said supporting member.

4. A sharpening device for the purpose stated, comprising a supporting member adapted to be attached to a lawn mower, said supporting member being provided with arms projecting therefrom to extend adjacent the rotary blade portion of the lawn mower, clips, a sharpening element engaged by said clips and extending lengthwise of said supporting member, said clips, together with said sharpening element, being adjustable lengthwise of said arms, and means for holding said clips in adjusted position on said arms.

5. A sharpening device for the purpose stated, comprising a supporting member adapted to be attached to a lawn mower, said supporting member being provided with arms projecting therefrom to extend adjacent the rotary blade portion of such lawn mower, said arms being longitudinally slotted, clips, a sharpening element secured in said clips to extend lengthwise of said supporting member, said clips and sharpening element being adjustable lengthwise of said arms, and means extending through the slots in said arms for securing said clips in adjusted position.

6. A sharpening device for the purpose stated, comprising a supporting member adapted to be pivotally connected directly with a part of the lawn mower, and a sharpening element on said member and adapted to be engaged by the cutting edges of the blade portion of the lawn mower, and spring means for yieldingly swinging said member at its pivotal connection with the lawn mower.

7. A sharpening device for the purpose stated, comprising a supporting member adapted to be pivotally connected directly with a part of the lawn mower, a sharpening element on said member, and adapted to be engaged by the cutting edges of the blade portion of the lawn mower, and spring means connected with said member, and having direct connection with the lawn mower for the purpose set forth.

8. The combination with a lawn mower of the type involving a rotatably mounted cutting blade device of a supporting frame pivotally connected directly with a cross-rod of the lawn mower, a sharpening element on said frame, and extending into a position in which it is engaged by the cutting edges of said blade device when the latter is rotated, and spring means operating to cause said cutting element to be pressed yieldingly into engagement with said blades.

9. A sharpening device for the purpose stated, comprising a supporting frame formed of arms spaced apart and connected together rigidly by a cross member, said arms and cross member forming a rigid structure, said frame being adapted for its sole support at one end of said arms on a part of the mower, and a sharpening element supported on said frame, and extending into a position in which it is engaged by the cutting edges of said blade device when the latter is rotated.

10. A sharpening device for the purpose stated, comprising a supporting frame formed of arms spaced apart and connected together rigidly by a cross member, said arms and cross member forming a rigid structure, said frame being adapted for its sole support at one end of said arms on a part of the mower, a sharpening element supported on said frame, and extending into a position in which it is engaged by the cutting edges of said blade device when the latter is rotated, and spring means for yieldingly forcing said element against the blade portion of the mower.

11. A sharpening device for the purpose set forth, comprising a rigid supporting member adapted to be attached to the body of a lawn mower to extend adjacent the rotary body portion thereof, and a sharpening element rigidly attached to said supporting member and adapted to be engaged by the cutting edges of said blade portion.

12. A sharpening device for the purpose set forth, comprising a rigid supporting member adapted to be attached adjacent one edge of the body of the lawn mower to extend rearwardly at its free edge adjacent the rotary blade portion of the mower, and a sharpening element rigidly attached to the rear portion of said member and adapted to be engaged by the cutting edges of said blade portion.

13. A sharpening device for the purpose set forth, comprising a supporting member adapted to be attached to, and receive its sole support from, a single cross-member of the mower, except for such support as may be afforded by the rotary blades of the mower by reason of the engagement therewith of the sharpening element hereinafter referred to, and a sharpening element carried by said member and adapted to be engaged by the cutting edges of said blade portion.

14. A sharpening device for the purpose set forth, comprising supporting means for a sharpening element, and a sharpening element connected therewith, said supporting means being adapted for connection, for the support of said means, with the body of the lawn mower, at one side only of said sharpening element, in a position in which said sharpening element extends into a position to be engaged by the rotary blades of the mower.

15. A sharpening device for the purpose set forth, comprising supporting means for a sharpening element, and a sharpening element adjustably connected therewith, said supporting means being adapted for connection, for the support of said means, with the body of the lawn mower, at one side only of said sharpening element, in a position in which said sharpening element extends into a position to be engaged by the rotary blades of the mower.

16. A sharpening device for the purpose set forth, comprising supporting means for a sharpening element, and a sharpening element connected therewith, said supporting means being adapted for connection, for the support of said means, with a cross-bar of the lawn mower at one side only of said sharpening element, in a position in which said sharpening element extends into a position to be engaged by the rotary blades of the mower.

17. A sharpening device for the purpose set forth comprising supporting means for a sharpening element, and a sharpening element rigidly connected therewith, said supporting means being adapted for connection, for the support of said means, with a cross-bar of the lawn mower at one side only of said sharpening element, in a position in which said sharpening element extends into a position to be engaged by the rotary blades of the mower.

18. A sharpening device for the purpose stated, comprising a supporting member adapted to be attached to a lawn mower, said supporting member being provided with arms projecting therefrom to extend adjacent the rotary blade portion of the lawn mower, clips, a sharpening element engaged by said clips and extending lengthwise of said supporting member, and means for holding said clips in position on said arms.

WALTER G. HILL.